United States Patent [19]
Gould et al.

[11] Patent Number: 5,854,300
[45] Date of Patent: Dec. 29, 1998

[54] PRINTING INK

[75] Inventors: Nigel Paul Gould, St Peters; Fereidoun Abbasi, Cliftonville, both of United Kingdom

[73] Assignee: Sericol Limited, United Kingdom

[21] Appl. No.: 824,735

[22] Filed: Mar. 26, 1997

[30]     Foreign Application Priority Data

Apr. 2, 1996 [GB] United Kingdom .................. 9606966

[51] Int. Cl.⁶ ..................................... C08G 18/32
[52] U.S. Cl. ................. 522/85; 522/90; 522/96; 524/457; 524/501; 524/589; 524/591; 428/423.1; 427/487
[58] Field of Search .................. 522/85, 90, 96; 524/454, 501, 589, 591; 428/423.1; 427/487

[56]         References Cited

FOREIGN PATENT DOCUMENTS

| 0 125 710 | 11/1984 | European Pat. Off. | C08F 299/06 |
| 0 311 288 | 4/1989 | European Pat. Off. | C08F 299/02 |
| 2 008 139 | 5/1979 | United Kingdom | C08F 2/46 |
| 2 256 874 | 12/1992 | United Kingdom | C08F 220/36 |

*Primary Examiner*—Duc Truong
*Attorney, Agent, or Firm*—Bacon & Thomas, PLLC

[57]                ABSTRACT

A water-based, UV-curable ink for plastic substrates, comprising:

a) a water-dispersible or water-soluble urethane acrylate oligomer;

b) a monomer that is capable of softening the substrate in part or in full; the monomer being resistant to hydrolysis; and c) a passive resin that is soluble in the monomer.

11 Claims, No Drawings

PRINTING INK

BACKGROUND OF THE INVENTION

The present invention concerns a printing ink, and in particular a water-based, UV-curable printing ink that is capable of adhering to plastic substrates.

Description of Related Art

A typical water-based, UV-curable ink currently on the market comprises: a non-ionic water soluble urethane acrylate; monomers such as tripropylene glycol diacrylate ('TPGDA') and ethoxylated trimethylol propane triacrylate ('ETMPTA'); water; a thickener; photoinitiators; flow aids; and pigments. The ink can be printed on to paper and board substrates through a plain weave mesh having a 150/cm mesh count. The inks exhibit good adhesion to paper and board substrates. Adhesion to substrates can be tested by scratching the dried ink with a fingernail and observing whether any ink is removed. If the ink is printed on to plastic substrates such as PVC or polystyrene, the adhesion is very poor and the ink can be easily removed by scratching.

SUMMARY OF THE INVENTION

The present invention is concerned with the problem of providing a water-based, UV-curable printing ink that exhibits improved adhesion to plastic substrates such as PVC and polystyrene.

DETAILED DESCRIPTION OF THE PREFERRED EMBODIMENTS

In accordance with the present invention there is provided a water-based, UV-curable ink that is capable of adhering to a plastic substrate, comprising:

a) a water-dispersible or water-soluble urethane acrylate oligomer;
b) a monomer that is capable of softening the substrate in part or in full; the monomer being resistant to hydrolysis; and
c) a passive resin that is soluble in the monomer.

In accordance with the present invention there is provided a method for preparing a water-based, UV-curable ink that is capable of adhering to a plastic substrate, the method comprising the steps of:

a) selecting a monomer that is capable of softening the plastic substrate in part or in full and is resistant to hydrolysis;
b) selecting a passive resin that is soluble in the monomer;
c) dissolving the passive resin in the monomer;
d) blending the passive resin and the monomer with a water-dispersible or water-soluble urethane acrylate oligomer; and
e) adding water to the blend.

The water-based, UV-curable ink preferably comprises:

a) from 3 to 30%, preferably from 10 to 20%, by weight of the water-dispersible or water-soluble urethane acrylate oligomer;
b) from 10 to 50%, preferably from 25 to 35%, by weight of the monomer that is capable of softening the substrate in part or in full and is resistant to hydrolysis; and
c) from 1 to 25%, preferably from 5 to 15%, by weight of the passive resin that is soluble in the monomer.

By the term 'passive resin' we mean a resin that would not substantially take part in a free radical, photopolymerisation reaction.

The inventors of the present invention have found a water-based, UV-curable ink that exhibits adhesion to plastic substrates such as polystyrene and PVC.

The monomer is preferably hexane diol diacrylate ('HDDA'). HDDA is a difunctional acrylate that offers a high cure rate. HDDA also exhibits excellent compatibility with and solvency for other resins and additives used in the ink.

The passive resin is preferably selected from the following list: solid epoxies, ketone resins, acrylate and methacrylate copolymers, vinyl resins, solid polyesters, phenoxy resins and cellulosics. The most preferred passive resins are acrylate or methacrylate copolymers.

The resin preferably has a Tg between 30° and 130° C.

Preferably at least 25 parts by weight of resin are dissolved in the monomer.

The ink preferably comprises at least 10%, more preferably at least 18%, even more preferably at least 25%, of water, based on the total weight of the ink.

The passive resin is preferably present in the ink in an amount from 1–25%, more preferably from 5–15%, by total weight.

The ink is preferably prepared by dissolving the selected passive resin in the monomer, and then adding the other components of the ink to the dissolved resin. A normal mechanical stirrer is used to disperse the components. A special high shear mixer is not required.

The ink can include any of the usual additives that are present such as: pigments, surfactants, UV stabilisers, photoinitiators and synergists, waxes, rheology modifiers, and other commonly used monomers and oligomers.

EXAMPLES

Tests to Find a Suitable Monomer

Test for Monomer's Ability to Soften a Plastic Substrate:

In order to test whether any of the selection of monomers listed below are capable of softening plastic substrates such as polystyrene and self-adhesive PVC, a small drop of each of the monomers was placed on to polystyrene and PVC substrates. After being left for 5 minutes, the monomers were removed from the substrates using a soft cloth and the surface of the substrates was examined for softening and marking. The results are as follows:

| Monomer | Polystyrene | Self-Adhesive PVC (Mactac 8129) |
|---|---|---|
| Tripropyleneglycol diacrylate | no mark | no mark |
| Ethoxylated trimethylol propane triacrylate | no mark | no mark |
| Trimethyl propane triacrylate | no mark | no mark substrate softened |
| 2 phenoxyethyl acrylate | no mark | no mark |
| Di-propylene glycol diacrylate | no mark | substrate softened |
| N vinyl caprolactam* | substrate softened | substrate softened |
| N N di-vinyl imidazole* | substrate softened | substrate softened |
| N vinyl pyrolidone | substrate softened | substrate softened |
| Hexane diol diacrylate | substrate softened | substrate softened |
| N vinyl formamide | substrate softened | substrate softened |
| Neopentyl glycol diacrylate | no mark | no mark |
| Octyldecyl acrylate | no mark | substrate softened |

*30% solutions in TPGDA since they are solid at ambient temperature.

The results show that only five out of the twelve monomers that were tested were capable of softening both plastic substrates.

Test For Monomer's Hydrolysis Resistance:

In order for the monomer to be used in a water-based ink, it needs to be resistant to hydrolysis. The five monomers that were capable of softening the polyolefin were tested for their resistance to hydrolysis. The monomers were tested for their hydrolytic stability under both acidic and basic conditions. Ten percent dispersions of the monomers were prepared in deionised water, with the pH being adjusted to 5 and 9 with dilute HCl and NaOH respectively. The samples were stored for 1 week at 40° C. and then checked for degradation using HPLC. Of the monomers tested, hexane diol diacrylate (HDDA) gave the best resistance properties.

Test for Monomer's Compatibility with other Components in the Ink:

The monomer's compatibility with other components in the ink was tested by formulating the ink and checking for general problems such as separation on storage. The test was carried out using HDDA and the HDDA was found to be compatible with the ink's other components.

Tests to find a Suitable Passive Resin

Test for Solubility in Monomer:

In the inks of the present invention, the passive resin must be soluble in the monomer. To test whether a selection of resins were soluble in HDDA, 25% solids solutions of a range of passive resin types were prepared in HDDA and the solutions were examined for clarity and stability towards separation. The solubility is largely linked to molecular weight within a group of similar resins: the lower molecular weight examples have the best solubility.

The test revealed that the following passive resins are suitable for incorporation into the inks of the present invention: solid epoxies, ketone resins, acrylate and methacrylate copolymers, vinyl resins, solid polyesters, phenoxy resins and cellulosics. The most preferred passive resins are acrylate or methacrylate copolymers.

Adhesion Test:

A selection of passive resins were incorporated into inks, and the inks were tested for their adhesion to a polystyrene substrate. The inks were made by initially preparing a 25% solids solution of the resin in HDDA. The other components of the ink were added sequentially while stirring with a mechanical stirrer. A formula similar to Example 1 below was used.

The inks were screen printed through a 150 plain weave mesh on to a polystyrene substrate. The films were cured at 30 m/min using 2 lamps at full power (Svecia UV drier, 2 80 w/cm medium mercury lamps). After the films were dried, they were examined for adhesion by scratching the films with a finger nail and observing whether the film was damaged or removed. The results are as follows:

| Resin | Type | Result |
|---|---|---|
| Paraloid B66 (sold by CHEMAC) | Methacrylate copolymer | Excellent film that could not be removed by scratching |
| Plexigum M345 (sold by Huls) | Methacrylate copolymer | Excellent film that could not be removed by scratching |
| Adhesion resin LTH (sold by Huls) | Polyester | Good film that could only be removed with difficulty by scratching |
| Synthetic resin 8K (sold by Huls) | Ketone | Fair adhesion but film could be removed by scratching |
| Surcol 836 (sold by Allied Colloids Limited) | Methacrylate copolymer | Good film that could only be removed with difficulty by scratching |
| CAB 381 (sold by EGGAR) | Cellulosic | Poor film that could easily be removed |
| Epikote 1001 (sold by SHELL) | Epoxy | Poor film that could easily be removed |
| Paphen-phenoxy PKHH (sold by Phenoxy Associates) | Phenoxy | Good film that could only be removed with difficulty by scratching |

As can be seen from the results in the above table, the best results were given by acrylate and methacrylate copolymers, phenoxy resins and solid polyester resins. The methacrylate copolymers exhibited the best combination of results for adhesion, solubility in the monomer and hydrolytic solubility. Further tests showed that hard, high Tg polymers exhibited the best adhesion results.

Hydroltytic Stability:

Resins were not tested for their hydrolytic stability in isolation. No particular problems were encountered with hydrolytic stability of the resins used in the previous tests. Methacrylate copolymers were selected on the basis that their other properties were suitable and that they are well known for their hydrolytic stability. Experimental ink samples were however checked for changes in pH on storage. A decrease in pH indicates hydrolysis problems.

Determination of Water Content

The following test was used to determine the required water content for the ink: A range of experimental inks were prepared with a water content ranging from 10% to 45%. The viscosities were adjusted using HDDA so that all of the inks were identical. The inks were printed through 150 plain weave mesh on to 500 micron polystyrene substrate. The films were cured with 1 pass through a Svecia UV drier at 25 m/min (2×80 w/cm medium pressure mercury lamps). The films were compared for their hardness and adhesion by scratching the films with a fingernail. The maximum water level giving acceptable adhesion was determined. A level of approximately 25% was found to give excellent adhesion and an excellent film weight. Higher levels of water can be used but problems with water retention in the film occur and a predry stage may be required before UV curing.

Preparation and Testing of Inks

The following inks were prepared:

Example 1

| | |
|---|---|
| Plexigum M345[1] | 6.0 |
| Hexane diol diacrylate | 28.3 |
| Surfactant | 1.0 |
| Water soluble urethane acrylate oligomer | 12.6 |
| Water | 25.0 |
| Isopropyl thioxanthone | 0.49 |
| Irgacure 184 | 2.93 |
| Amine synergist | 1.98 |
| Di trimethylol propane tetra acrylate | 8.0 |
| Magenta pigment base[2] | 13.0 |
| UV stabiliser | 0.7 |
| Total | 100.0 |

[1]Available from Huls

Example 2

| | |
|---|---|
| Paraloid B66[3] | 6.0 |
| Hexane diol diacrylate | 28.3 |
| Surfactant | 1.0 |
| Water soluble urethane acrylate oligomer | 12.6 |
| Water | 25.0 |
| Isopropyl thioxanthone | 0.49 |
| Irgacure 184 | 2.93 |
| Amine synergist | 1.98 |
| Di trimethylol propane tetra acrylate | 8.0 |
| Magenta pigment base[2] | 13.0 |
| UV stabiliser | 0.7 |
| Total | 100.0 |
| [2]Magenta pigment base: | |
| Polyester urethane acrylate | 37.64 |
| Tripropylene glycol diacrylate | 37.09 |
| UV stabiliser | 0.18 |
| Sunfast magenta 228 0013 | 19.64 |
| Cromophthal red BRN | 5.45 |

[3]Available from CHEMAC

Comparative Example 1

| | |
|---|---|
| Water soluble urethane acrylate oligomer | 35.0 |
| Tripropylene glycol diacrylate | 14.0 |
| Irgacure 184 | 2.0 |
| Silicone flow aid | 1.0 |
| Surfactant | 1.0 |
| Magenta pigment | 2.5 |
| Water | 43.5 |
| UV stabiliser | 1.0 |
| Total | 100.0 |

Comparative Example 2

| | |
|---|---|
| Water soluble urethane acrylate oligomer | 35.0 |
| Hexane diol diacrylate | 14.0 |
| Irgacure 184 | 2.0 |
| Silicone flow aid | 1.0 |
| Surfactant | 1.0 |
| Magenta pigment | 2.5 |
| Water | 43.5 |
| UV stabiliser | 1.0 |
| Total | 100.0 |

Comparative Example 3

| | |
|---|---|
| Plexigum M345 | 6.0 |
| N-vinyl caprolactam | 18.3 |
| Ethoxylated trimethylol propane triacrylate | 10.0 |
| Surfactant | 1.0 |
| Water soluble urethane acrylate | 12.6 |
| Water | 25.0 |
| Isopropyl thioxanthone | 0.49 |
| Irgacure 184 | 2.93 |
| Amine synergist | 1.98 |
| Di trimethylol propane tetra acrylate | 8.0 |
| Magenta pigment base[2] | 13.0 |
| UV stabiliser | 0.7 |
| Total | 100.0 |

The inks were printed as before using a 150 plain weave mesh and a selection of substrates. The films were dried using a Svecia UV drier (2×80 w/cm mercury lamps).

The inks were tested for their adhesion to plastic substrates using the following methods:

a) fingernail scratch test as previously described; and b) cross hatch tape adhesion: The films were scored using a scalpel so that a block of one hundred 1mm squares were produced. A small piece of adhesive tape was fixed securely over the scored area and removed with a swift wrist action. The adhesion is gauged by the number of small squares removed from the substrate.

Results

| Ink | Adhesion to Plastic Substrates |
|---|---|
| Example 1 | Excellent adhesion to plastic substrates including self-adhesive PVC, rigid PVC and polystyrene |
| Example 2 | Excellent adhesion to plastic substrates including self-adhesive PVC, rigid PVC and polystyrene |
| Comparative Example 1 | Extremely poor adhesion to plastic substrates |
| Comparative Example 2 | Exhibited only limited adhesion to some plastic substrates such as self-adhesive PVC |
| Comparative Example 3 | Exhibited excellent adhesion to plastic substrates such as self-adhesive PVC, rigid PVC and polystyrene; however, ageing of the wet ink at 40° C. for 4 weeks caused the ink to exhibit poor adhesion because of poor hydrolysis resistance. |

The above results clearly show that only inks falling within the present invention exhibit good adhesion to plastic substrates such as self-adhesive PVC, rigid PVC and polystyrene.

We claim:

1. A water-based, UV-curable ink for plastic substrates, comprising:

a) a water-dispersible or water-soluble urethane acrylate oligomer;

b) a monomer that is capable of softening the substrate in part or in full; the monomer being resistant to hydrolysis; and c) a passive resin that is soluble in the monomer said passive resin having a Tg between 30° and 130° C.

2. The water-based, UV-curable ink as claimed in claim 1, wherein the monomer is hexane diol diacrylate.

3. The water-based, UV-curable ink as claimed in claim 1, wherein the passive resin is selected from the group consisting of: solid epoxies, ketone resins, acrylate and methacrylate copolymers, vinyl resins, solid polyesters, phenoxy resins and cellulosics.

4. The water-based, UV-curable ink as claimed in claim 1, wherein at least 25 parts by weight of passive resin are dissolved in the monomer.

5. The water-based, UV-curable ink as claimed in claim 1, wherein the ink comprises at least 10%, of water, based on the total weight of the ink.

6. The water-based, UV-curable ink as claimed in claim 1, wherein the passive resin is present in the ink in an amount from 1–25%, by total weight.

7. A method for preparing a water-based, UV-curable ink that is capable of adhering to plastic substrates, the method comprising the steps of:

a) selecting a monomer that is capable of softening the plastic substrate in part or in full and is resistant to hydrolysis;

b) selecting a passive resin that is soluble in the monomer said passive resin having a Tg between 30° and 130° C.;

c) dissolving the passive resin in the monomer;

d) blending the passive resin and the monomer with a water-dispersible or water-soluble urethan acrylate oligomer; and e) adding water to the blend.

8. The water-based, UV-curable ink as claimed in claim 3, wherein the passive resin is an acrylate or methacrylate copolymer.

9. The water-based, UV-curable ink as claimed in claim 5, wherein the ink comprises at least 18%, of water, based on the total weight of the ink.

10. The water-based, UV-curable ink as claimed in claim 9, wherein the ink comprises at least 25%, of water, based on the total weight of the ink.

11. The water-based, UV-curable ink as claimed in claim 6, wherein the passive resin is present in the ink in an amount from 5–15%, by total weight.

* * * * *